UNITED STATES PATENT OFFICE.

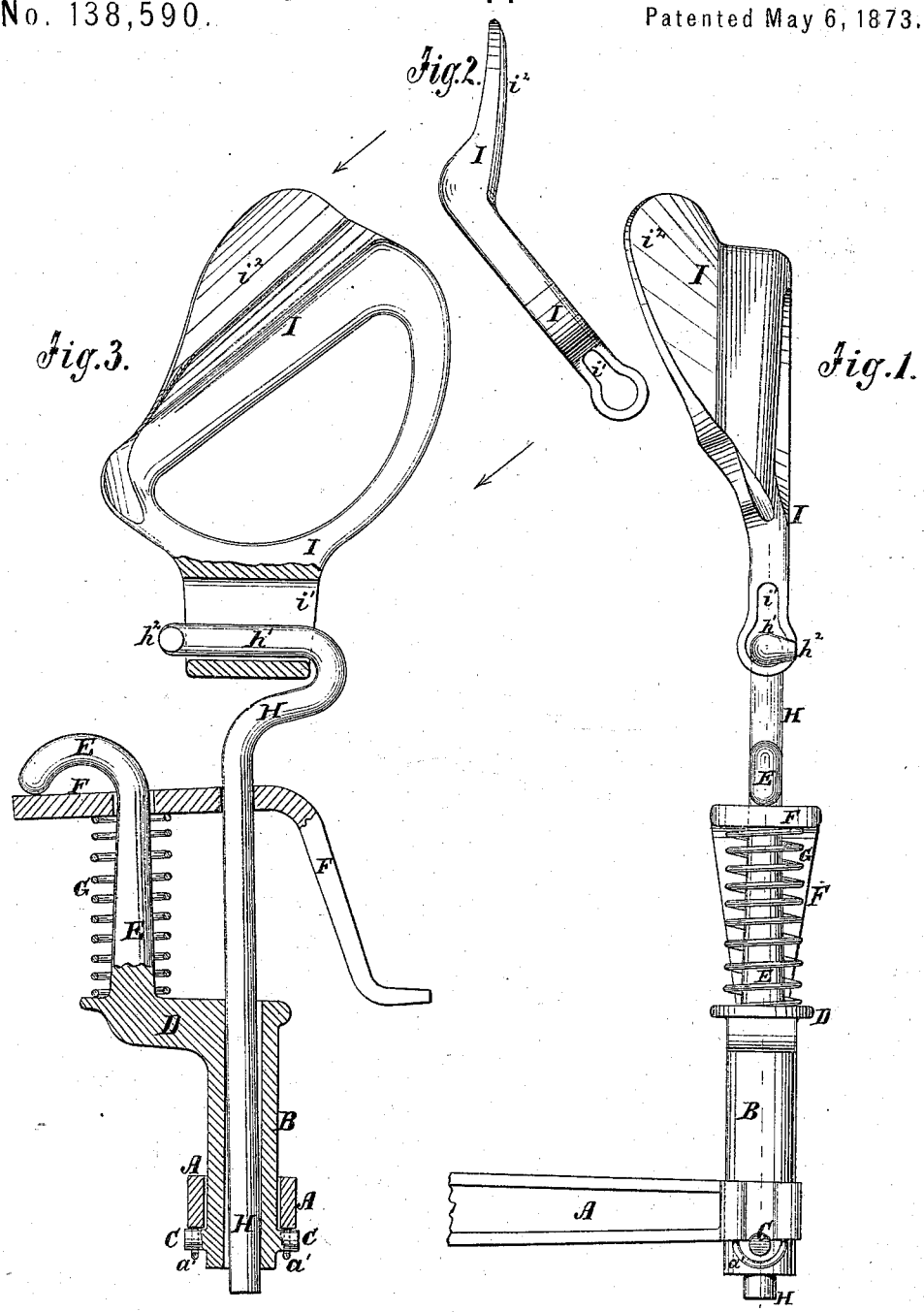

JOHN SMITH, OF PHILADELPHIA, PENNSYLVANIA.

IMPROVEMENT IN GYMNASTIC APPARATUS.

Specification forming part of Letters Patent No. 138,590, dated May 6, 1873; application filed February 10, 1872.

*To all whom it may concern:*

Be it known that I, Dr. JOHN SMITH, of Philadelphia, in the county of Philadelphia and State of Pennsylvania, have invented a new and useful Improvement in Gymnastic Apparatus, of which the following is a specification:

Figure 1 is a front view of a part of a gymnastic apparatus illustrating my invention. Fig. 2 is a detail edge view of the handle. Fig. 3 is a detail sectional view of the same, showing the inner side of the handle.

My invention has for its object to improve the construction of gymnastic or hygienic apparatus in such a way that the lifting-rods may be instantly adjusted as required, and that the handles may be properly fitted to the hands so as to produce the best possible effect; and it consists in the construction and combination of various parts of the apparatus, as hereinafter more fully described.

A is the cross-bar, with which the weight to be lifted is connected, and the ends of which are forked to fit upon the side of the lower end of the tube B. The lower edges of the forked ends of the bar A are notched to fit upon gudgeons C, formed upon the opposite sides of the lower ends of the tubes B, where the said ends are secured in place by wire staples or keepers $a'$, attached to said ends and passing around said gudgeons, as shown in Figs. 1 and 3. Upon one side of the upper end of the short tube B is formed a shoulder or bracket, D, upon which is formed or to which is attached the shank of a hook, E, which is passed through a hole in the lever F, so that the point or end of the said hook E may rest upon the upper side of the end of the said lever F. The lever F is bent, as shown in Fig. 3, so that its lower end may be conveniently pressed downward by the person standing upon the platform of the apparatus with his toes. G is a coiled spring placed upon the shank of the hook E, with its lower end resting upon the upper side of the shoulder or bracket D, and with its upper end resting against the under side of the end of the lever F, as shown in Figs. 1 and 3. H is the lifting-rod, which passes through and works up and down freely in the tube B. The rod H also passes through a hole in the lever F, as shown in Fig. 3.

By this construction the part of the lever F through which the rod H passes will be raised by the spring G so as to bite or nip the rod H, so that the said rod cannot be drawn upward, but any strain upon it will only cause it to be more firmly held, while at the same time a slight downward pressure upon the lower or bent end of the lever F will free the rod H, and allow it to be raised and lowered freely to adjust it as required, thus enabling the lifting-rods H to be instantly adjusted.

Upon the upper end of the rod H is formed a hook, $h^1$, which passes through a hole in the shank of the handle I. Upon the end of the hook $h^1$ is formed a small hook, $h^2$, projecting horizontally, and at right angles with the hook $h^1$, as shown in Figs. 1 and 3. In the shank of the handle I, at the upper side of the hole through said shank is formed a groove or slot, $i$, of sufficient size to receive the hook $h^2$.

By this construction the handles I, when turned into a horizontal position, can be conveniently slipped upon and from the hook $h^1$, but cannot come off when in a vertical or working position.

The hole through the handles I to receive the hand is made wider in its forward and lower end, in accordance with the fact that the part of the hand with which the forefingers are connected is thicker than the part with which the little fingers are connected. The hand-piece or part of the handle grasped by the hand is made with its forward end or the part grasped by the forefingers inclined downward, as shown in Fig. 3, in accordance with the fact that when the arm is extended downward, or in any other direction, the part of the hand with which the forefingers are connected will be at a greater distance from the shoulder than the part with which the little fingers are connected.

Upon the hand-piece of the handle I is formed a flange, $i^2$, the upper or rear part of which is made wider, and is so formed as to fit upon the palm of the hand, so as to bring the muscles of the whole hand into action when power is exerted upon said handle. The forward or lower part of the flange $i^2$ is made narrow, as shown in Figs. 1 and 3, and is so formed as to allow the thumb to take its natural position when the hand grasps the said handle.

This construction of the handle allows the power of the hand to be applied in such a manner as to produce its greatest and most beneficial effects by calling all the muscles into play while in their natural positions.

Having thus described my invention, I claim as new and desire to secure by Letters Patent—

1. The bent lever F, hook E, and coiled spring G, in combination with the lifting-rod H and tube B, through which said rod passes, substantially as herein shown and described, and for the purposes set forth.

2. The hook $h^2$, formed upon the end of the hook $h^1$ of the rod H, and the slot or groove $i^1$, formed in the shank of the handle I at the upper side of the hook hole through said shank, substantially as herein shown and described, and for the purpose set forth.

3. The combination of the handle I $i^1$ $i^2$, hooked rod H $h^1$ $h^2$, lever F, hook E, coiled spring G, and tube B, provided with gudgeons C, with each other and with the cross-bar A, substantially as herein shown and described, and for the purpose set forth.

JOHN SMITH.

Witnesses:
  E. G. SMITH,
  FRANK M. ETTING.